United States Patent [19]
Fairbanks

[11] 3,949,031
[45] Apr. 6, 1976

[54] METHOD FOR MAKING CELLULAR ARTICLES

[75] Inventor: Theodore H. Fairbanks, Liverpool, Pa.

[73] Assignee: FMC Corporation, Philadelphia, Pa.

[22] Filed: Aug. 9, 1973

[21] Appl. No.: 387,022

Related U.S. Application Data

[60] Continuation-in-part of Ser. No. 65,158, Aug. 19, 1970, abandoned, which is a division of Ser. No. 743,683, July 10, 1968, Pat. No. 3,607,596.

[52] U.S. Cl. .............. 264/51; 156/167; 156/181; 156/244; 264/46.1; 264/46.3; 264/46.5; 264/94; 264/95; 264/96; 264/167; 264/177 R; 264/210 R; 425/72 R; 425/382 R; 428/71; 428/159; 428/304
[51] Int. Cl.². B29C 23/00; B29D 27/02; B29F 3/06
[58] Field of Search ....... 264/50, 54, 171, 172, 173, 264/174, 237, 167, 51, 177 R, 46.1, 46.3, 46.5, 94, 95, 96, 210 R; 161/68, 134, 135, 136, 139, 168; 156/167, 181, 244; 425/72, 382; 428/159, 71, 304

[56] References Cited
UNITED STATES PATENTS

| | | | |
|---|---|---|---|
| 1,394,270 | 10/1921 | Brandenberger | 264/167 X |
| 1,780,330 | 11/1930 | Blair | 264/50 X |
| 2,149,425 | 3/1939 | Draemann | 264/176 F X |
| 2,363,051 | 11/1944 | Dosmann | 264/54 |
| 2,437,884 | 3/1948 | Maynard | 264/167 X |
| 2,455,509 | 12/1948 | Luaces | 264/167 X |
| 2,834,045 | 5/1958 | Davies | 264/50 X |
| 2,866,256 | 12/1958 | Matlin | 264/167 X |
| 3,121,130 | 2/1964 | Wiley et al | 264/DIG. 14 |
| 3,180,910 | 4/1965 | Buhmann | 264/174 X |
| 3,372,920 | 3/1968 | Corbett et al | 264/173 X |
| 3,709,970 | 1/1973 | Hemker | 264/237 X |

FOREIGN PATENTS OR APPLICATIONS
257,734  7/1961  Australia .............................. 264/167

*Primary Examiner*—Philip Anderson

[57] ABSTRACT

A method for making a cellular article in which at least some of a plurality of extruded, generally parallel streams of strand-forming organic, thermoplastic, polymeric material are periodically expanded to provide bulbous portions along the lengths thereof, with such bulbous portions contacting and bonding with adjacent streams during their expansion, after which the streams are set to provide an integral article.

9 Claims, 8 Drawing Figures

METHOD FOR MAKING CELLULAR ARTICLES

This application is a continuation-in-part of my application Ser. No. 65,158, filed Aug. 19, 1970, now abandoned which in turn is a division of my application Ser. No. 743,683, filed July 10, 1968, and now U.S. Pat. No. 3,607,596.

The present invention relates to a method for making articles of cellular structure.

A primary object of the present invention is to provide a generally new or improved and more satisfactory method for making an article of cellular structure.

Another object is the provision of an improved, continuous method for making an article of cellular structure which is of minimum weight and inexpensive.

Still another object is to provide an improved method for making an article which is decorative in appearance and of netlike construction.

A further object is the provision of an improved method for making articles, having a cellular structure, which are relatively thick in cross-section.

A still further object is the provision of a method for making a thick and generally rigid article having a network of passages extending therethrough.

These and other objects are accomplished in accordance with the present invention by a method in which a plurality of generally parallel, elongated members having bulbous portions which are bonded to members adjacent thereto whereby the plurality of elongated members together provide an integral article.

The articles formed by the method of the present invention may consist of a single layer or row of elongated members bonded to each other at the bulbous portions thereof in side-by-side relationship or in a plurality of layers in which the elongated members in at least some of the layers are bonded to each other in side-by-side relationship or are spaced from each other and bonded to elongated members in adjacent layers. The bulbous portions may vary in size, shape or spacing along the individual elongated members.

Articles formed by the method of the present invention which are perhaps simplest in form consist of elongated members bonded to each other in side-by-side relationship, with each of such members having bulbous portions which are similar in size, shape and spacing. In such article, the longitudinally spaced bulbous portions of adjacent elongated members may be aligned with and bonded to each other.

A single layer of elongated members having aligned and bonded bulbous portions provides a net-like article which has good flexibility in both its longitudinal and transverse directions and is useful, for example, as a cushioning material. If such article is formed of a polymeric material, it may be uniaxially or biaxially stretched to orient the molecules thereof and render such article suitable for uses, such as a non-woven fabric, rug backing or in laminated or composite structures.

Articles formed of a number of layers of such elongated members, in which the aligned bulbous portions are bonded to each other, are more rigid and can be rather massive in size, if so desired. Generally, straight openings extend through such article from all sides, giving it a honeycomb structure. Articles of this character are relatively strong, yet light in weight and are useful, for instance, in space-filling or shock insulating applications.

By the method of the present invention, the elongated members may also be bonded together in a side-by-side arrangement, with the bulbous portion, which are similar in size, shape and spacing, of adjacent elongated members being in staggered or offset relationship. If such bulbous portions are spaced along their respective members a distance less than the length of an invididual bulbous portion, generally no openings exist between adjacent bulbous portions in the resulting article. On the other hand, if the spacing of such bulbous portions exceeds their individual lengths, the resulting article is net-like in appearance or includes tortuous passages extending therethrough, depending upon the number of layers of the elgonated members bonded together.

While preferred, the bulbous portions of the elongated members need not be of the same size, shape and spacing. It is essential, of course, that all of the elongated members forming an article be bonded to each other. Thus, the bulbous portions of adjacent elongated members of an article may be of such size, shape or spacing that they are bonded to each other at certain locations, yet at other locations the bulbous portion of such members may be bonded to the adjacent member between its bulbous portions. It is also possible to provide articles in which adjacent elongated members in the same plane are not directly bonded to each other but are bonded to elongated members in adjacent planes which themselves are bonded to each other.

From the standpoint of ease of manufacture, the bulbous portions of the elongated members are preferably of spherical or perhaps elliptical configuration. Preferably, at least the bulbous portions of the elongated members are of cellular construction, with each containing at least one and desirably a multiplicity of voids. If desired the elongated members and/or the bulbous portions thereof may be different in color and/or at least some of the bulbous portions may contain reflective material, such as aluminum particles or flakes to impart decorative effects of the resulting articles.

Preferably, employed in the method of the present invention are strand-forming, organic, thermoplastic polymeric materials which are customarily employed in the manufacture of foamed articles. Such polymeric materials include the normally solid polymers or mixtures of polymers, including such materials as polymers of ethylene, propylene, styrene, vinyl chlorides, etc., as well as materials of cellulosic polymers and derivatives thereof, as for example, in the form of viscose and cellulose acetate solutions.

The method of the present invention includes the steps of extruding a plurality of continuous and generally parallel streams of flowable strand-forming material, causing at least some of the extruded streams to periodically expand while the strand-forming material thereof is in a flowable condition to provide bulbous portions at spaced intervals along the lengths thereof which contact and bond with streams adjacent thereto during the expansion thereof, and setting the extruded strand-forming material to solidify the streams into an integral structure.

The periodic expansion of the streams of strand-forming material may be effected by intermittently injecting a fluid into such streams concomitantly with the extrusion thereof. The injected fluid is inert with respect to the strand-forming material being extruded and may assist in setting of the streams. Such fluid may be either a liquid such as "Freon" (dichlorodifluomethone) or a gas, as for example, air, nitrogen, carbon dioxide, or a mixture thereof, such as steam. Alternatively, the bulbous portions may be formed along the lengths of the extruded streams of strand-forming material, which may be either a froth or homogenous material, for examples, by periodically varying the extrusion pressure and/or the rate at which the resulting elongated members or resulting article is taken up or collected. Foamable compositions include, for example, a thermoplastic polymeric material containing a chemical blowing agent which is decomposed and causes the strand-forming material to foam as it is extruded into a zone of lower pressure.

The degree of periodic expansion of the stream of strand-forming material is such as to provide bulbous portions along the length thereof which contact and bond with the strands which are adjacent thereto. The extruded streams may be periodically expanded simultaneously, whereby the bulbous portions of adjacent streams contact and bond with each other along planes extending generally perpendicular to the direction of extrusion. The article formed by this procedure, as heretofore mentioned, will have a net-like structure with openings being formed in the article between adjacent bulbous portions. Alternatively, the periodic expansion of adjacent extruded streams may be effected in out-of-phase relationship, so that the bulbous portions of each stream are staggered with relation to the bulbous portions of streams which are adjacent thereto.

It will, of course, be apparent that the periodic expansion of the individual extruded streams may be varied as to degree and/or frequency and may differ from the periodic expansion of streams which are adjacent thereto. Further, the rate at which expansion occurs to provide an individual bulbous portion may itself be varied to provide such bulbous portion with a desired shape.

In the drawing, FIG. 1 is a diagrammatic view illustrating one mode of practicing the method of the present invention;

Figure 1:
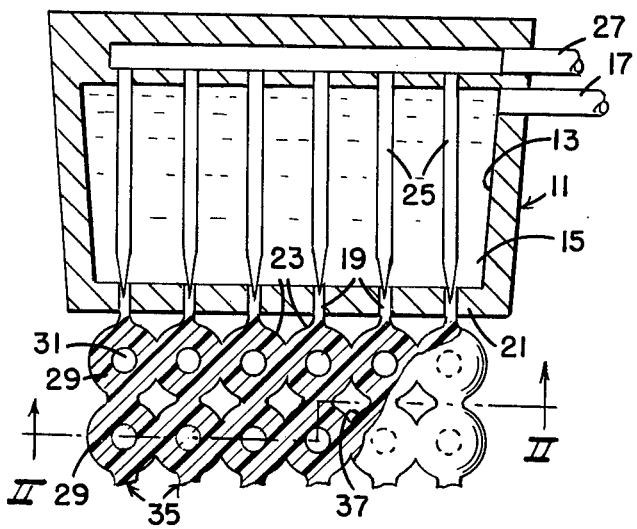

With reference to the drawing, FIG. 1 illustrates an extrusion device 11 having a cavity 13 into which a flowable strand-forming material 15, as for example a molten, thermoplastic polymeric material, is delivered under pressure through a pipe 17 from a suitable source, not shown. A row of openings 19 extend through wall 21 of the extrusion device 11 for discharging the strand-forming material 15 as a plurality of spaced, continuous streams 23. Fluid injection capillary tubes 25 project from a supply header 27 and have conical or tapered free ends which are aligned with and extend into the extrusion openings 19.

In the operation of the above-described apparatus the flowable strand-forming material 15 is extruded under pressure from the cavity and through the openings 19 as continuous streams 23. A fluid, preferably air, is delivered under a pulsating pressure from a suitable source, not shown, through the header 27 and tubes 25 and is injected simultaneously into all of the streams 23. This injected fluid serves to periodically expand the extruded streams of strand-forming material 23 into bulbous portions 29 each having a void 31.

The degree of periodic expansion of the streams of strand-forming material 23 is such that the bulbous portions 29 which are formed along adjacent of such streams contact and bond with each other. After such bulbous portions have bonded, the strand-forming material is set, as by one or more streams of cool air supplied by suitable nozzles, not shown.

The article 33 formed by the above-described method includes a series of elongated members 35 which are connected to each other at the locations of contact of the bulbous portions 29. Openings 37 extend through the article between the locations at which the bulbous portions are bonded to each other, thus giving the article 33 a net-like construction. The article 33 may be stretched along one or both of its axial directions, using conventional equipment, to orient the molecules thereof and thus improve its strength properties.

Figure 2:
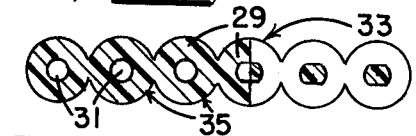
FIG. 2 is a section taken along the line II—II of FIG. 1.
Figure 3:
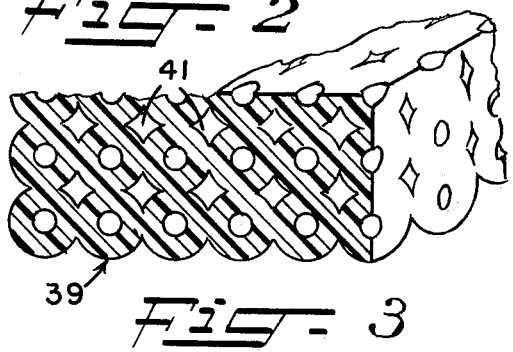
FIG. 3 is a section similar to FIG. 2 taken through another article formed by the method of the present invention.

As shown in FIG. 2, the article 33 formed by the above-described method consists of a single layer of elongated members 35 connected to each other in side-by-side relationship. The extrusion device 11 may be provided with additional rows of extrusion openings 19 and capillary tubes to provide multi-layered articles 39, as shown in FIG. 3. Substantially straight and intersecting openings 41 extend through the article 39 from all of its sides giving it a generally honey-comb construction.

Figure 4:
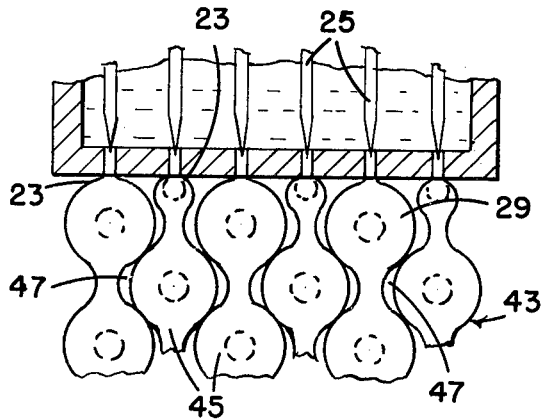
FIG. 4 is a view similar to FIG. 1 showing another mode of practicing the method of the present invention.

The method illustrated in FIG. 4 employs an apparatus similar to that of FIG. 1, with the exception that adjacent tubes 25 are connected to separate fluid supply means, not shown. This may be achieved, for example, by having alternate tubes 25 connected to the same fluid supply header or by having a separate fluid supply means for each tube 25.

In practicing the method of the present invention with the apparatus of FIG. 4, continuous streams 23 of strand-forming material extruded from the openings 19 are periodically expanded into cellular bulbous portions 29 by fluid injected into such streams by the capillary tubes 25. The fluid injected into the extruded streams 23 by alternate tubes 25 occurs simultaneously and alternately with the injection of fluid by the tubes 25 which are directly adjacent thereto. In this manner, the bulbous portions 29 along adjacent extruded streams 23 are in staggered relationship. The degree of expansion of the streams of strand-forming material is such as to have the bulbous portions 29 of each stream at least contact with the streams adjacent thereto.

Figure 5:
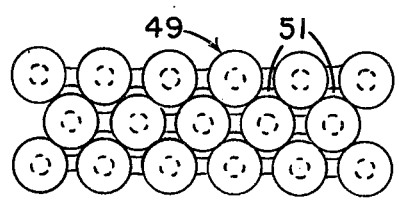
FIG. 5 is a section through an article as produced by the method shown in FIG. 4.

The article 43 produced by the method shown in FIG. 4 consists of a single layer of elongated members 45 having bulbous portions and a staggered array of openings 47. Stretching of the article 43 to induce molecular orientation may be effected by conventional equipment. As with the method shown in FIG. 1, the method illustrated in FIG. 4 may be used to make multi-layer articles 49 as shown in FIG. 5. The article 49 includes openings 51 which extend from all sides thereof and which together follow tortuous paths through the article itself.

Figure 6:
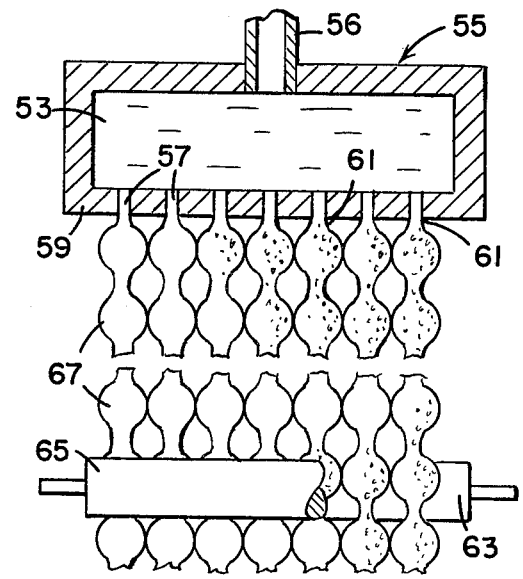
FIG. 6 is a view similar to FIG. 1 showing a further mode of practicing the method of the present invention.

The method of the invention is particularly adapted for use in making articles from foamable strand-forming compositions, as illustrated in FIG. 6. The foamable compositions may include, for example, a thermoplastic polymeric material, such as polypropylene, and a chemical blowing agent, as for example azodicarbonamide, which decomposes as the thermoplastic material is rendered molten and provides a saturated solution of gases within the melt at the particular extrusion temperature and pressure conditions which are to be employed. Various additives, such as blowing agent activators, nucleating agents, pigments, etc. may also be incorporated into the foamable comosition.

As shown in FIG. 6 a foamable composition 53, as described above, is delivered under pressure from a suitable source, not shown, to an extrusion device 55 by a conduit 56. A row of openings 57 extends through wall 59 of the device 53 from which the foamable strand-forming material issues as a series of continuous streams 61. As such streams leave the openings 57 and enter into the surrounding atmosphere, which is under lower pressure, the gases contained therein cause the same to expand.

Periodically, the extruded streams 61 of strand-forming material are tensioned and thus stretched as they leave the openings 57 of the extrusion device 55. Such tensioning of the streams may be effected, for example, by a pair of nip rolls 63 and 65 which are driven at a varying rate of speed and engage with the extruded material which has been set. The sections of the extruded streams 61 of strand-forming material which are so tensioned and stretched will thus expand to a lesser degree than the sections which are adjacent thereto. These latter sections will thus appear as bulbous portions, as indicated at 67.

The degree to which the individual streams are permitted to expand must be such as to permit the bulbous portions 67 of adjacent streams to contact and bond with each other. Quenching of the contacting streams of foamed material may be achieved, as by streams of cool air.

Figure 7:
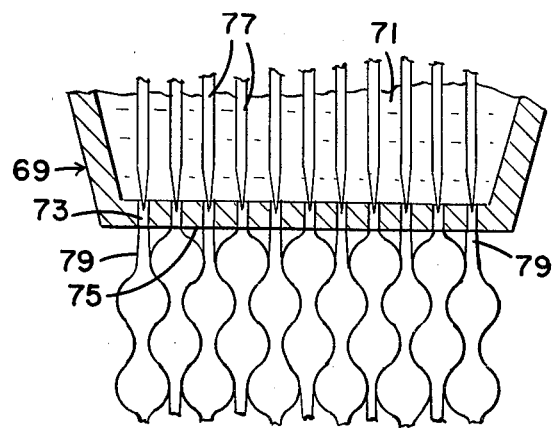
FIG. 7 is a view similar to FIG. 1 showing a still further mode of practicing the method of the present invention.

Foamable strand-forming material may also be extruded into articles in a manner as shown in FIG. 7. The apparatus employed includes an extrusion device 69 into which a foamable composition 71 is delivered under pressure. Openings 73 extend through wall 75 of the device 69 and needles 77 project into such openings. Suitable means, not shown, are provided for reciprocating alternate needles 77 simultaneously and in alternate sequence with the needles 77 adjacent thereto.

In operation, foamable strand-forming material issues from the openings 73 of the extrusion device 69 as continuous streams 79. Each of these streams will expand as they enter into the surrounding atmosphere and will contact and bond with the streams which are adjacent thereto. Periodically the flow of foamable strand-forming material passing into and through the openings 73 is partially closed off by the needles 77, with such restricted flow occurring simultaneously through alternate openings 73 and in alternate relationship with the openings 73 adjacent thereto. Thus, each of the streams of strand-forming material issuing from the openings 73 are each formed with bulbous portions 80, with the bulbous portions of adjacent streams being in staggered relationship.

During the expansion of the streams, the bulbous portions 80 of each of the streams contact and bond with the streams which are adjacent thereto, after which the extruded material is set, as by streams of cool air. The resulting product exhibits a cellular structure throughout and is generally similar to that shown in FIG. 4 of the drawing.

The articles produced by the method shown in FIGS. 6 and 7 are essentially the same as that shown in FIGS. 2 and 4, with the exception that the elongated members forming the same are of cellular or foamed structure throughout their lengths. Such articles may be stretched to molecularly orient the same. Further, as with the method shown in FIGS. 1 and 4, the methods illustrated in FIGS. 6 and 7 may be used in making multi-layered articles similar to those shown in FIGS. 3 and 5, respectively.

Figure 8:
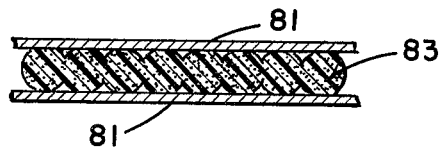
FIG. 8 is a section through a composite product showing one use of an article formed by the method of the present invention.

As heretofore mentioned, the articles formed by the method of the present invention are adapted for a variety of uses. One such use is illustrated in FIG. 8 wherein a cellular article, as produced by the method of FIG. 6, is bonded to and between a pair of cover sheets 81 to provide a composite product 83 having good heat, sound, and shock insulating properties.

It is to be understood that changes and variations may be made without departing from the spirit and scope of the invention as defined in the appended claims.

I claim:

1. A method which includes the steps of extruding a plurality of spaced, continuous generally parallel streams of flowable strand-forming, organic, thermoplastic polymeric material, periodically expanding each of the spaced, extruded streams concomitantly with the continuous extrusion thereof and while the strand-forming material thereof is in a flowable condition to provide at spaced intervals along the length of each such stream bulbous portions which, during the formation thereof, contact and bond with streams which are adjacent thereto, and setting the extruded strand-forming material to solidify the streams into an integral structure.

2. A method as defined in claim 1 wherein periodic expansion of the respective streams of strand-forming material is effected by intermittently injecting a fluid into such streams concomitantly with the extrusion thereof whereby the bulbous portions are of cellular structure.

3. A method as defined in claim 1 in which the strand-forming material is a foamable material and wherein such foamable material is extruded under a varying pressure whereby the extruded streams are caused to periodically expand to provide bulbous portions of cellular structure along the lengths thereof.

4. A method as defined in claim 3 in which the pressure applied to the foamable strand-forming material of adjacent streams is periodically varied in alternate relationship whereby the bulbous portions of each stream is bonded to adjacent streams between bulbous portions thereof.

5. A method as defined in claim 1 in which the strand-forming material is a foamable material and further including the step of advancing the set, integral structure away from the location of extrusion at a varying rate to thereby provide bulbous portions along the length of the respective streams which are being extruded.

6. A method as defined in claim 1 in which the foamable strand-forming material is an orientable polymeric material and further including the step of stretching the set, integral structure at least along one of its longitudinal and transverse directions to orient the molecules thereof.

7. A method as defined in claim 2 wherein said fluid is a gas.

8. A method as defined in claim 2 wherein said fluid is a liquid.

9. A method as defined in claim 2 wherein said fluid is a mixture of a gas and liquid.

* * * * *